United States Patent

(12) United States Patent
Hayano

(10) Patent No.: US 11,520,040 B2
(45) Date of Patent: Dec. 6, 2022

(54) PRECIPITATION PARTICLE DISCRIMINATION DEVICE, PRECIPITATION PARTICLE DISCRIMINATION SYSTEM, PRECIPITATION PARTICLE DISCRIMINATION METHOD AND PRECIPITATION PARTICLE DISCRIMINATION PROGRAM

(71) Applicant: Furuno Electric Co., Ltd., Nishinomiya (JP)

(72) Inventor: Mariko Hayano, Nishinomiya (JP)

(73) Assignee: FURUNO ELECTRIC CO., LTD., Nishinomiya (JP)

(*) Notice: Subject to any disclaimer, the term of this patent is extended or adjusted under 35 U.S.C. 154(b) by 266 days.

(21) Appl. No.: 17/018,509

(22) Filed: Sep. 11, 2020

(65) Prior Publication Data
US 2020/0408904 A1    Dec. 31, 2020

Related U.S. Application Data

(63) Continuation of application No. PCT/JP2019/005952, filed on Feb. 19, 2019.

(30) Foreign Application Priority Data

Mar. 13, 2018 (JP) .............. JP2018-046047

(51) Int. Cl.
*G01S 13/95*  (2006.01)
*G01S 13/34*  (2006.01)
(Continued)

(52) U.S. Cl.
CPC .......... *G01S 13/95* (2013.01); *G01S 13/346* (2013.01); *G01W 1/14* (2013.01); *G06K 9/6267* (2013.01); *G06N 5/048* (2013.01)

(58) Field of Classification Search
CPC ................. G01S 13/95; G01S 13/346
(Continued)

(56) References Cited

U.S. PATENT DOCUMENTS 6,081,220 A  *  6/2000  Fujisaka ............... G01S 13/951
                                                          702/3
6,473,026 B1 * 10/2002  Ali-Mehenni .......... G01S 7/025
                                                          342/188
(Continued)

FOREIGN PATENT DOCUMENTS

JP    2002-098760 A    4/2002
JP    2002-156467 A    5/2002
(Continued)

OTHER PUBLICATIONS

Cao et al., "Automatic classification of hydrometeors based on polarimetric weather radar measurements", 2005, IEEE International Radar Conference. (Year: 2005).*

(Continued)

*Primary Examiner* — Ricky Go
(74) *Attorney, Agent, or Firm* — Xsensus LLP

(57) ABSTRACT

To provide a precipitation particle classification apparatus for obtaining a proper classification result of precipitation particles based on information from a plurality of radar devices. The precipitation particle classification apparatus includes a data processing part, a fuzzy processing part, a coordinate conversion part, an interpolation part, and a classification part. The data processing part acquires polarization parameters obtained by reflection on the precipitation particles from each of the plurality of radar devices which are arranged at different positions and have a part of a scanning area overlapping with each other. The fuzzy processing part obtains a polar coordinate distribution evaluation value indicating the distribution in polar coordinates of an evaluation value indicating the degree of attribution to (Continued)

each type of precipitation particles from polarization parameters by using a fuzzy inference. The coordinate conversion part converts the polar coordinate distribution evaluation value into the Cartesian coordinate distribution evaluation value. The interpolation part integrates the Cartesian coordinate distribution evaluation values whose positions on the coordinates are substantially equal among the Cartesian coordinate distribution evaluation values obtained for each of the plurality of radar devices to obtain a composite evaluation value. The classification part classifies precipitation particle species based on the composite evaluation value.

12 Claims, 5 Drawing Sheets

(51) Int. Cl.
  *G01W 1/14* (2006.01)
  *G06K 9/62* (2022.01)
  *G06N 5/04* (2006.01)
(58) Field of Classification Search
  USPC .......................................................... 702/3
  See application file for complete search history.

(56) References Cited

U.S. PATENT DOCUMENTS

| | | | |
|---|---|---|---|
| 8,368,581 | B2 | 2/2013 | Hannesen et al. |
| 10,026,163 | B2* | 7/2018 | Fallgatter .............. G01B 11/24 |
| 2004/0201515 | A1* | 10/2004 | Testud .................... G01S 13/95 |
| | | | 342/188 |
| 2010/0315432 | A1* | 12/2010 | Hannesen .............. G01S 7/024 |
| | | | 345/629 |
| 2015/0145717 | A1 | 5/2015 | Lim |

FOREIGN PATENT DOCUMENTS

| | | |
|---|---|---|
| WO | 2017/051647 A1 | 3/2017 |
| WO | 2017/145587 A1 | 8/2017 |

OTHER PUBLICATIONS

Extended European search report dated Nov. 17, 2021, in corresponding European patent Application No. 19767734.7, 11 pages.
International Search Report and Written Opinion dated May 7, 2019 for PCT/JP2019/005952 filed on Feb. 19, 2019, 9 pages including English Translation of the International Search Report.
Dolan, B., and Rutledge, S. A., "A Theory-Based Hydrometeor Identification Algorithm for X-Band Polarimetric Radars," Journal of Atmospheric and Oceanic Technology, vol. 26, Oct. 2009, pp. 2071-2088.
Kouketsu, T., et al., "A Hydrometeor Classification Method for X-Band Polarimetric Radar: Construction and Validation Focusing on Solid Hydrometeors under Moist Environments," Journal of Atmospheric and Oceanic Technology, vol. 32, pp. 2052-2074.
Marzano, F. S., et al., "Supervised Fuzzy-Logic Classification of Hydrometeors Using C-Band Weather Radars," IEEE Transactions on Geoscience and Remote Sensing, vol. 45, No. 11, Nov. 2007, pp. 3784-3799.

* cited by examiner

PRECIPITATION PARTICLE DISCRIMINATION DEVICE, PRECIPITATION PARTICLE DISCRIMINATION SYSTEM, PRECIPITATION PARTICLE DISCRIMINATION METHOD AND PRECIPITATION PARTICLE DISCRIMINATION PROGRAM

CROSS-REFERENCE TO RELATED APPLICATIONS

This application is a bypass continuation of PCT filing PCT/JP2019/005952, filed Feb. 19, 2019, which claims priority under 35 U.S.C. § 119 to Japanese Patent Application No. 2018-046047, filed on Mar. 13, 2018, the entire disclosure of each is hereby incorporated by reference.

TECHNOLOGICAL FIELD

The present disclosure relates to a precipitation particle classification apparatus for classifying the type of the precipitation particle as at least one of rain, hail, dry, snow, snow hail, ice crystal and the like.

BACKGROUND

A technique to classify the type of precipitation particles by using a dual polarization radar device which transmits and receives horizontal polarization and vertical polarization is known. Non-patent document 1 discloses this kind of the precipitation particle classification method.

The precipitation particle classification method of the non-patent document 1 includes classifying the type of the precipitation particles based on a fuzzy inference. In the non-patent document 1, the type of the precipitation particles is classified by applying a membership function to a radar reflectivity Zh, a differential reflectivity Zdr, a correlation coefficient phv, and a specific differential phase Kdp among polarization parameters acquired from scanning of the dual polarization radar device.

As used herein, the non-patent document 1 may be Takeharu Kouketsu, Hiroshi Uyeda, Tadayasu Ohigashi, Mariko Oue, Hiroto Takeuchi, Taro Shinoda, and Kazuhisa Tsuboki, 2015: A Hydrometer or Classification Method for X-Band Polarimetric Radar: Construction and Validation Focusing on Solid Hydrometers under Moist Environments, JOURNAL OF ATMOSPHERIC AND OCEANIC TECHNOLOGY, Vol. 32, 2052-2074.

However, the non-patent document 1 only discloses the classification of the precipitation particles by the observation of one radar device. The non-patent document 1 does not disclose how to obtain a comprehensive classification result when observed by a plurality of radar devices.

SUMMARY

It is an object of the present disclosure to provide a precipitation particle classification apparatus capable of obtaining a proper classification result of precipitation particles based on information from the plurality of radar devices.

According to a first aspect of the present disclosure, there is provided a precipitation particle classification apparatus. The precipitation particle classification apparatus includes a processing circuitry configured to: receive a reception signal obtained by reflecting on precipitation particles from each of a plurality of radar devices arranged at mutually different positions and have a part of the scanning area overlapped with each other; and calculate a polarization parameter based on the reception signal. The processing circuitry is further configured to calculate a polar coordinate distribution evaluation value indicating a distribution on polar coordinates of an evaluation value which indicates a degree of attribution for each type of the precipitation particles, based on the polarization parameter, by using a fuzzy interface. Further, the processing circuitry is configured to: convert the polar coordinate distribution evaluation value into a Cartesian coordinate distribution evaluation value indicating a distribution of the evaluation value on Cartesian coordinates; integrate the Cartesian coordinate distribution evaluation value whose position is substantially equal to each other among Cartesian coordinate distribution evaluation values calculated for each of the plurality of radar devices; and output a composite evaluation value. Furthermore, the processing circuitry is configured to classify the type of the precipitation particle based on the composite evaluation value.

The precipitation particle classification apparatus provided herein does not integrate qualitative classification results individually obtained by observation of each of the plurality of radar devices at a portion where scanning area of each radar device overlap with each other. Instead, the precipitation particle classification apparatus integrates a quantitative evaluation value calculated for each radar device by evaluating the degree of attribution to each type of the precipitation particle using the fuzzy inference. Accordingly, a single classification result is obtained based on the composite evaluation value calculated by integrating the Cartesian coordinate distribution evaluation values. Further, by adopting the precipitation particle classification method disclosed herein, it is possible to obtain an appropriate classification result by using the fuzzy inference.

According to some embodiments, the processing circuitry is configured to store at least one fuzzy membership function for each of the plurality of radar devices; and determine, using the at least one fuzzy membership function for each of the plurality of radar devices, the degree of attribution. The at least one fuzzy membership function is different for each of the plurality of radar devices.

To that end, an imbalance in the Cartesian coordinate distribution of evaluation values can be prevented before integrating the Cartesian coordinate distribution evaluation values to calculate the composite evaluation value, when the at least one fuzzy membership function for each of the plurality of radar devices captures a difference in characteristics of each of the plurality of radar devices.

It is preferable that the processing circuitry calculates an average value of the Cartesian coordinate distribution evaluation values which are in substantially the same position on the Cartesian coordinates among the plurality of radar devices; and outputs the composite evaluation value based on the average value.

Thus, it is possible to accurately classify a type of the precipitation particle, because the composite evaluation value having validity can be calculated by averaging the Cartesian coordinate distribution evaluation values which are in substantially the same position on the Cartesian coordinates among the plurality of radar devices.

It is preferable that the processing circuitry calculates the composite evaluation value by performing a weighting set based on signal intensity or a signal-to-noise ratio of the reception signal obtained from the position to which the Cartesian coordinate distribution evaluation value is associated.

Thus, in an overlapping area of the scanning area, the weighting set is performed according to a reliability of signal data to integrate the Cartesian coordinate distribution evaluation values which are in substantially the same position on the Cartesian coordinates among the plurality of radar devices, therefore the type of the precipitation particle can be classified more accurately.

It is preferable that the processing circuitry calculates the composite evaluation value by performing a weighting set based on a distance between the position to which the Cartesian coordinate distribution evaluation value is associated and the radar device outputting a polarization parameter corresponding to the Cartesian coordinate distribution evaluation value.

Thus, the type of the precipitation particle can be classified more accurately by performing the weighting set based on the distance from each radar device in the overlapping area of scanning.

According to a second aspect of the present disclosure, there is provided a precipitation particle classification system. The precipitation particle classification system includes a first radar device, a data processing part, a fuzzy processing part, a coordinate conversion part, an interpolation part, and a classification part. The first radar device is arranged such that a part of its scanning area is overlapped with that of a radar device located at a position different from the first radar device.

To provide a precipitation particle classification system for classifying a type of a precipitation particle based on signals inputted from a plurality of radar devices.

According to a third aspect of the present disclosure, a precipitation particle classification method is provided. The precipitation particle classification method includes calculating polarization parameter based on a received signal obtained by reflection on precipitation particles are acquired from each of a plurality of radar devices arranged at different positions and having a part of scanning areas overlapped with each other. The precipitation particle classification method includes calculating, using a fuzzy inference, a polar coordinate distribution evaluation value indicating the distribution in polar coordinates of an evaluation value indicating the degree of attribution to each type of precipitation particle based on the polarization parameter. The precipitation particle classification method includes converting the polar coordinate distribution evaluation value into a Cartesian coordinate distribution evaluation value indicating a distribution of the evaluation value on an Cartesian coordinates system. The precipitation particle classification method includes integrating the Cartesian coordinate distribution evaluation value whose position is substantially equal to each other among Cartesian coordinate distribution evaluation values calculated for each of the plurality of radar devices and outputting a composite evaluation value. The precipitation particle classification method includes classifying the type of the precipitation particle based on the composite evaluation value.

According to a fourth aspect of the present disclosure, the precipitation particle classification program is provided. The non-transitory computer-readable media having program code recorded thereon for precipitation particle classification cause a computer to execute a data processing step, a fuzzy processing step, a coordinate conversion step, an interpolation step, and a classification step. In the data processing step, a polarization parameter based on a received signal obtained by reflection on the precipitation particles is acquired from each of a plurality of radar devices arranged at different positions and having a part of the scanning area overlapped with each other. In the fuzzy processing step, the polar coordinate distribution evaluation value polar coordinate distribution evaluation value indicating the degree of attribution to each type of the precipitation particle is calculated from the polarization parameter by using a fuzzy inference. In the coordinate conversion step, the polar coordinate distribution evaluation value is converted into Cartesian coordinates to calculate the Cartesian coordinate distribution evaluation value indicating the distribution of the evaluation value expressed in the Cartesian coordinates system. In the interpolation step, among the Cartesian coordinate distribution evaluation values calculated for each of the plurality of radar devices, the Cartesian coordinate distribution evaluation values having substantially equal positions on coordinates are integrated to obtain a composite evaluation value. In the classification step, the type of the precipitation particle is classified based on the composite evaluation value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

Figure 1:
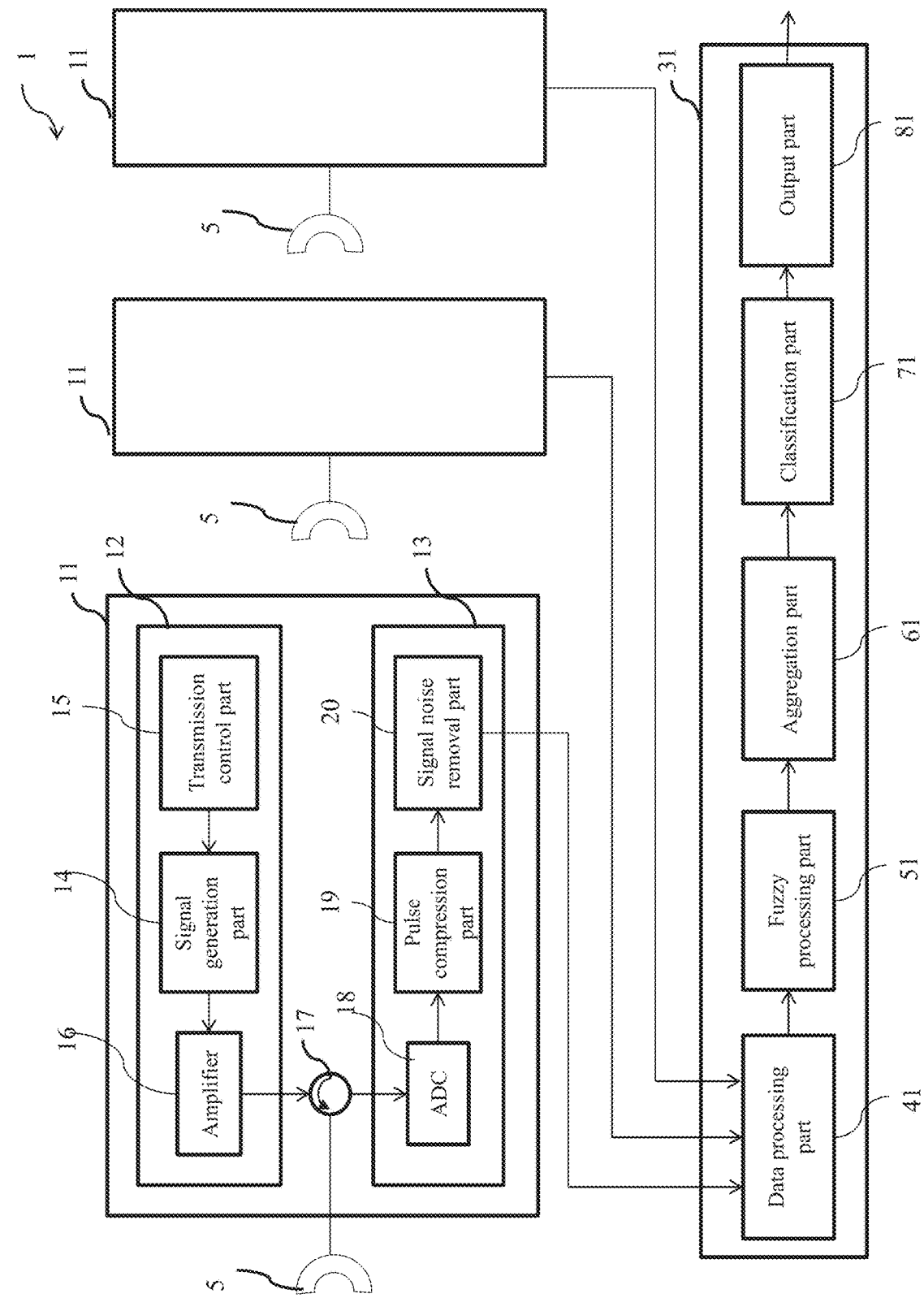
FIG. 1 is a block diagram showing an exemplary architecture of a precipitation particle classification system including a precipitation particle classification apparatus according to an embodiment of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example." "For instance." and "such as," and the verbs "comprising," "having." "including." and their other verb forms, when used in conjunction with a listing of one or more components or other items, are each to be construed as open ended, meaning that that the listing is not to be considered as excluding other, additional components or items. The term "based on" means at least partially based. Other terms are to be construed using their broadest reasonable meaning unless they are used in a context that requires a different interpretation.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Figure 2:
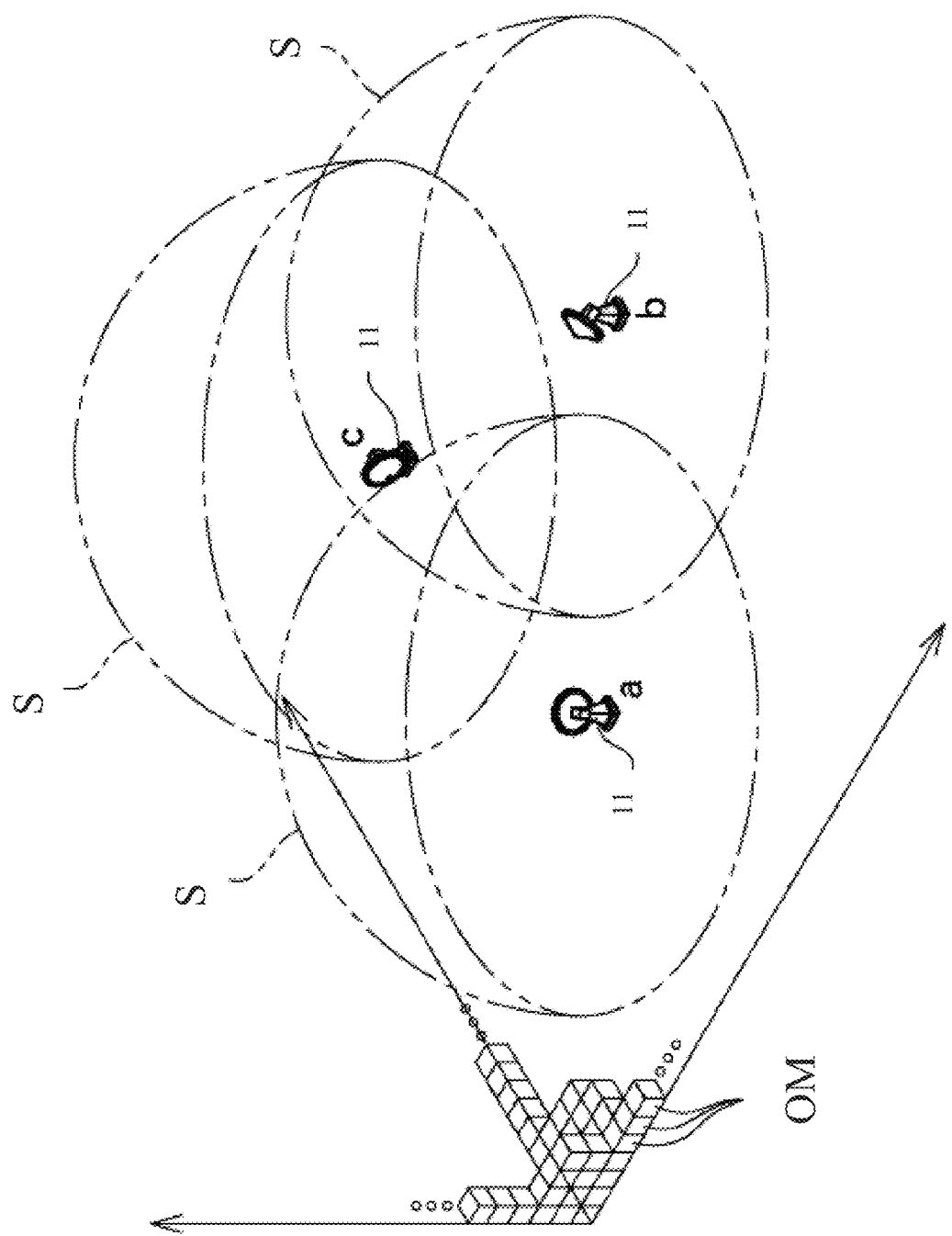
FIG. 2 is a perspective view showing a relationship between scanning areas of a plurality of radar devices.
Figure 3:
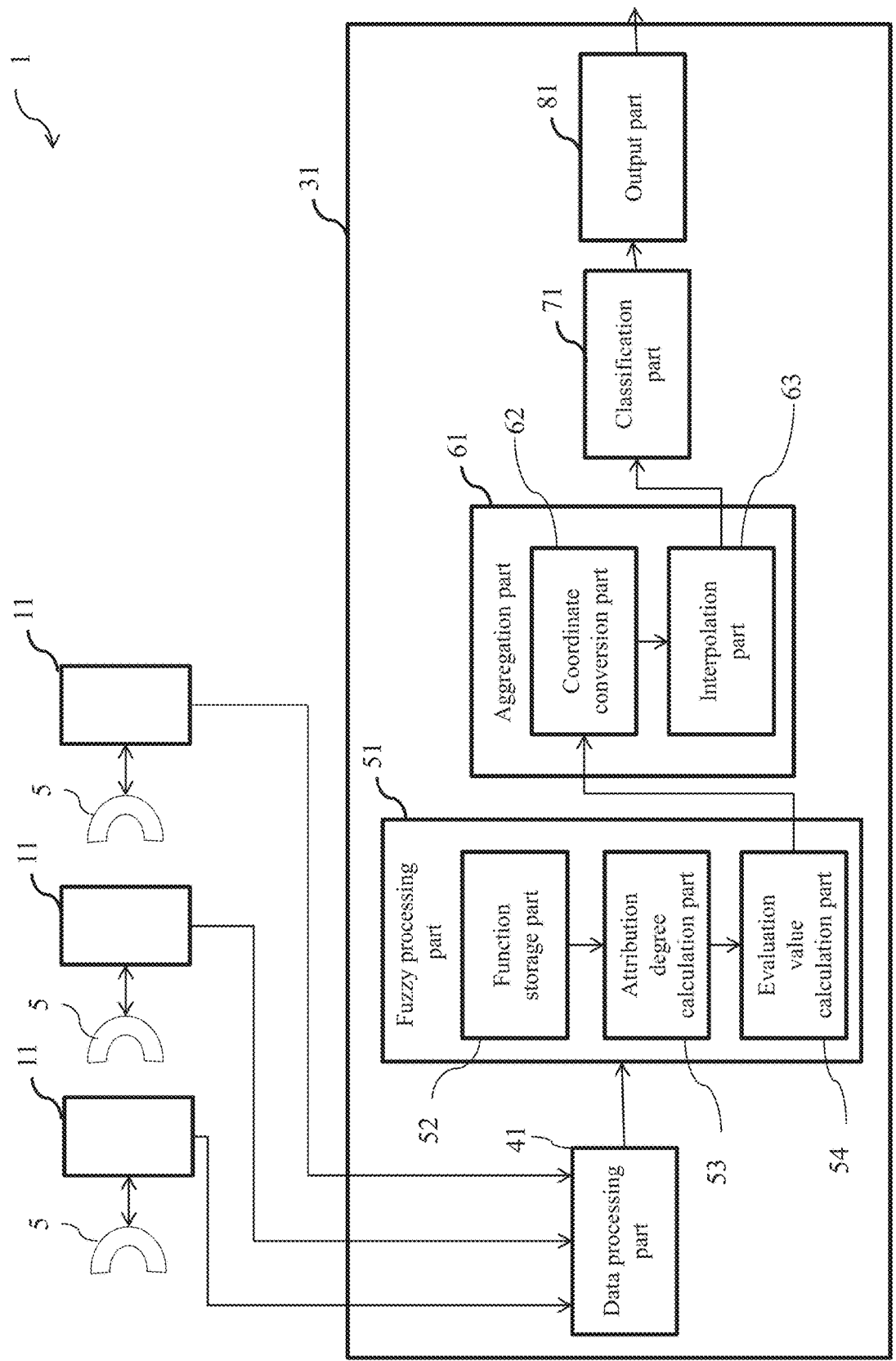
FIG. 3 is a block diagram showing an exemplary architecture of the precipitation particle classification apparatus in detail.
Figure 4:
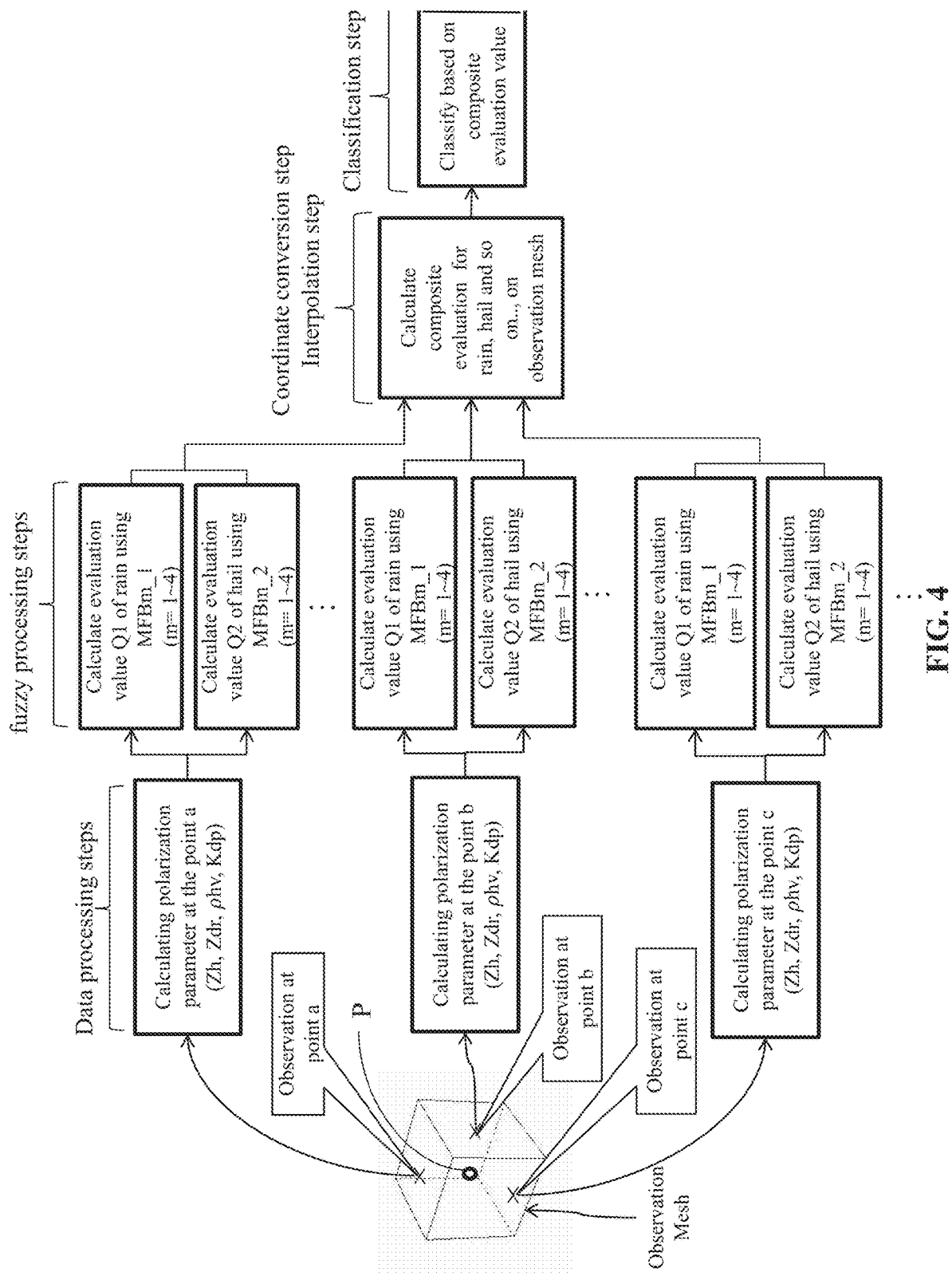
FIG. 4 is a schematic diagram showing a flow for calculating evaluation values based on the fuzzy inference, integrating the evaluation values, and classifying the type of the precipitation particle by the precipitation particle classification apparatus.

Embodiments of the present disclosure are described with reference to drawings. FIG. 1 is a block diagram showing an exemplary architecture of a precipitation particle classification system 1 including a precipitation particle classification apparatus 31 according to an embodiment of the present disclosure. FIG. 2 is a perspective view showing a relationship between scanning areas S of a plurality of radar devices 11. FIG. 3 is a block diagram showing an exemplary architecture of the precipitation particle classification apparatus 31 in detail. FIG. 4 is a schematic diagram showing a flow for calculating evaluation values based on the fuzzy inference; integrating the evaluation values; and classifying the type of the precipitation particle by the precipitation particle classification apparatus 31.

The precipitation particle classification system 1 shown in FIG. 1 is a weather observation system that observes precipitation and classifies the type of the precipitation particles. The precipitation particle classification system 1 includes the plurality of radar devices 11 and the precipitation particle classification apparatus 31.

As shown in FIG. 2, the plurality of radar devices 11 are arranged at different points a, b and c so as to scan a predetermined area. In the following description, an area scanned by each radar device 11 may be referred to as a scanning area.

In an embodiment, the plurality of radar devices 11 perform three-dimensional scanning. As shown in FIG. 2, the scanning area S may be referred to as a three-dimensional area. However, the plurality of radar devices 11 may perform two-dimensional scanning, and in this case, the scanning area may be referred to as a two-dimensional area.

Each radar device 11 obtains data related to weather by scanning each scanning area S. In this embodiment, as shown in FIG. 2, the scanning areas S of the three radar devices 11 partially overlap with each other.

The radar device 11 may be the dual-polarization radar, which observes various types of precipitation particles by transmitting two types of radio waves such as a radio wave of horizontal polarization and a radio wave of vertical polarization. The radar device 11 may be referred to as a multi-parameter radar. In an embodiment, the radar device 11 transmits and receives a radio wave having a frequency of, for example, X band. In an alternate embodiment, the radar device 11 may transmit and receive a radio wave having a frequency of C band or S band. In an embodiment, the precipitation particle classification system 1 comprises the plurality of radar devices 11 that transmits and receives the radio waves of same frequency. In an alternate embodiment, the precipitation particle classification system 1 comprises the plurality of radar devices 11 that transmits and receives the radio waves of different frequencies.

As shown in FIG. 1, each radar device 11 is electrically connected to the precipitation particle classification apparatus 31. The radar device 11 transmits data relating to the received signal to the precipitation particle classification apparatus 31 by a known communication means.

The radar device 11 includes a transmission signal output part 12, an antenna part 5, and a reception signal processing part 13.

The transmission signal output part 12 outputs a transmission signal to an antenna part 5. The transmission signal output part 12 includes a signal generation part 14, a transmission control part 15, and an amplifier 16. The signal generation part 14 generates the transmission signal and outputs it to the amplifier 16. The transmission control part 15 controls output timing to output the transmission signal. The amplifier 16 amplifies the transmission signal outputted from the signal generation part 14 and then outputs to the antenna part 5 via a circulator 17.

The antenna part 5 transmits the transmission signal as the radio wave to the scanning area S and receives a reflected wave of the radio wave reflected by the precipitation particles or the like. The antenna part 5 is rotated in a horizontal plane by a rotating mechanism using a motor or the like as a driving source to continuously transmit and receive the radio waves. Further, the antenna part 5 transmits and receives the radio waves by changing an elevation angle by the rotation mechanism. Thus, the radar device 11 can three-dimensionally scan a hemispherical scanning area S. The antenna part 5 outputs the signal received to the reception signal processing part 13 via the circulator 17.

The reception signal processing part 13 performs signal processing on the signal received from the antenna part 5. The reception signal processing part 13 includes an AD converter 18, a pulse compression part 19, and a signal noise removal part 20.

The AD converter 18 converts the received signal into a digital signal and outputs the digital signal to the pulse compression part 19.

The pulse compression part 19 performs pulse compression on the digital signal received from the AD converter 18 by a known technique such as Fourier transform to improve a S/N ratio of the received signal. The pulse compression part 19 outputs the signal subjected to the pulse compression processing to the signal noise removing part 20.

The signal noise removal part 20 removes noise such as frequency noise from the signal received from the pulse compression part 19. The signal noise removal part 20 outputs the noise-removed signal to a data processing part 41.

As shown in FIGS. 1 and 3, the precipitation particle classification apparatus 31 includes the data processing part 41, a fuzzy processing part 51, an aggregation part 61, a classification part 71, and an output part 81.

Specifically, the precipitation particle classification apparatus 31 is implemented by a processing circuitry such as a computer having a known configuration. The computer has a CPU, a ROM, a RAM, an I/O interface. The ROM stores a program for realizing the precipitation particle classification method of the present disclosure and the like. The precipitation particle classification apparatus 31 is operated as the data processing part 41, the fuzzy processing part 51, the aggregation part 61, the classification part 71 and the output part 81 by cooperation of the hardware and the software.

The data processing part 41 calculates a polarization parameter for each radar device 11, based on the received signals which are both horizontal polarization and vertical polarization reception signals received by each radar device 11. For one radar device 11, various polarization parameters are calculated for each of polar coordinate meshes (not shown) obtained by finely dividing the scanning area S in a distance direction and an angle direction. Each polarization parameter is associated with a position of a polar coordinate mesh in a three-dimensional space. The position of the polar coordinate mesh is expressed by a spherical coordinate system $(r, \theta, \varphi)$ which is a kind of a polar coordinate system with the position where each radar device 11 is installed at an origin.

The polarization parameters calculated by the data processing part 41 include at least one of a radar reflectivity Zh, a differential reflectivity Zdr, a correlation coefficient phv, a specific differential phase Kdp or a combination thereof. The data processing part 41 may also calculate, for example, a Doppler velocity Vd or the like as the polarization parameter.

The data processing part 41 repeats the calculation of the polarization parameter each time the radar device 11 scans the scanning area S and a newly reception signal is received. The data processing part 41 calculates the polarization parameters for a polar coordinate mesh determined by each of the three radar devices 11 at predetermined time intervals (For example, every minute).

The data processing part 41 outputs a polar coordinate distribution of various polarization parameters (Zh, Zdr, phv, and Kdp) calculated for each radar device 11 to the fuzzy processing part 51.

The fuzzy processing part 51 applies a fuzzy membership function MBF to a polarization parameter of each polar coordinate mesh acquired for each radar device 11 for classifying the type of the precipitation particle. The fuzzy processing part 51 outputs a polar coordinate distribution of evaluation values based on a fuzzy inference, for each radar device 11. Hereinafter, the polar coordinate distribution of evaluation values may be referred to as a polar distribution evaluation values.

Although the fuzzy inference is well-known, the fuzzy interface is briefly described below. The fuzzy inference determines, using an attribution function (for instance, the fuzzy membership function), a value between zero and one to indicate whether an element belongs to a set (for instance, a fuzzy set). The value equal to zero (0) indicates that the element does not belong completely to the set. On the contrary, the value equal to one (1) indicates that the element belongs completely to the set. In the fuzzy inference, an ambiguous state between the complete absence and complete belonging of the element to the set (for the fuzzy set) is represented by a value greater than 0 and less than 1.

As shown in FIG. 3, the fuzzy processing part 51 includes a function storage part 52, an attribution degree calculation part 53, and an evaluation value calculation part 54.

The function storage part 52 stores the fuzzy membership function MBF described above. The fuzzy membership function MBF stored in the function storage part 52 is a function determined in advance by an experiment or the like. The function storage part 52 stores the fuzzy membership function MBF indicating degree to which precipitation particles belong to various types such as rain, hail, dry snow, snow hail, ice crystal and the like.

The fuzzy membership function MBF is determined for each polarization parameter (the radar reflectivity Zh, the differential reflectivity Zdr, the correlation coefficient phv, and the specific differential phase Kdp) that is an input variable and the fuzzy membership function MBF is determined for each element in the set (i.e. the types of the precipitation particles). Therefore, when a number of the polarization parameters is M and a number of the types of the precipitation particles to be classified is N, a number of fuzzy membership functions MBF is M×N.

In the following description, two subscript numbers such as $MBF_{m\_n}$ (where m and n are integers equal to or greater than 1) are added to specify the respective fuzzy membership functions. The front subscript number m is an index assigned to the polarization parameter as an input variable for the fuzzy membership function. The index is determined as one (1) for the radar reflectivity Zh, two (2) for the differential reflectivity Zdr, three (3) for the correlation coefficient phv, and four (4) for the specific differential phase Kdp. The trailing subscript number n is an index assigned to the type of the precipitation particle for which the fuzzy membership function determines the degree of attribution. The index is one (1) for rain, two (2) for hail . . . and so on.

The attribution degree calculation part 53 inputs the various polarization parameters calculated by the data processing part 41 to the fuzzy membership function $MBF_{m\_n}$ stored in the function storage part 52 for each polar coordinate mesh, and calculates the attribution degree to which the precipitation particles at the point belong to each type (In the above example, rain, hail, . . . etc.). Thus, M×N degree values are calculated for one polar coordinate mesh. The attribution degree calculation part 53 outputs the calculated attribution degree to the evaluation value calculation part 54.

The evaluation value calculation part 54 calculates an evaluation value based on the attribution degree received from the attribution degree calculation part 53 for each polar coordinate mesh. Thus, an evaluation value Q1 of rain, an evaluation value Q2 of hail . . . so on are calculated for each polar coordinate mesh. The evaluation value for each type of the precipitation particle is quantitative information. Accordingly, the type of precipitation particle, at the position, having a largest evaluation value among the types of the precipitation particles is determined as the type of the precipitation particle (for example, rain) at the position.

The evaluation value is calculated, for example, by adding the degree of attribution. The evaluation value calculation part 54 inputs the various polarization parameters obtained in a certain polar coordinate mesh to M fuzzy membership functions MBFm_1 for obtaining the degree of attribution to rain for each input variable (i.e. Zh, Zdr, phv, Kdp), calculates the sum of the degree of attribution, and obtains the evaluation value Q1 of rain in the polar coordinate mesh. The evaluation value calculation part 54 inputs the various polarization parameters obtained in the polar coordinate mesh to a plurality of fuzzy membership functions MBFm_2 for obtaining the degree of attribution to hail for each input variable (i.e. Zh, Zdr, phv, Kdp), calculates the sum of the degree of attribution, and obtains the evaluation value Q2 of hail in the polar coordinate mesh. Similarly, the evaluation value calculation part 54 can calculate the evaluation value Qn for those other than the rain and the hail.

In this way, the evaluation value calculation part 54 calculates the evaluation values Q1, Q2, and . . . so on of each kind of precipitation particle for each polar coordinate mesh by dividing the scanning area S for each radar device 11. The evaluation value calculating part 54 outputs the distribution of the obtained evaluation values in the scanning area S to the aggregating part 61 as a polar coordinate distribution.

In the fuzzy processing part 51, a common fuzzy membership function is used for the plurality of radar devices 11. However, when characteristics of the plurality of radar devices 11 are different from each other, M×N fuzzy membership functions MBF may be determined for each radar device 11 and stored in the function storage part 52. Since the difference in the characteristics of the plurality of radar device 11 is absorbed by the fuzzy membership functions MBF to obtain an evaluation value, integration of the evaluation values described later can be performed in a balanced manner.

The aggregating part 61 aggregates the polar coordinate distribution evaluation values for each radar device 11 calculated by the fuzzy processing part 51 to generate a composite evaluation value distribution. The evaluation value distribution acquired by the aggregating part 61 covers the entire three-dimensional space that includes the scanning areas S of each of the plurality of radar devices 11, and is a square grid type observation meshes OM that partitions the three-dimensional space.

As described above, the scanning areas S of the plurality of radar devices 11 partially overlap with each other. Therefore, the observation mesh OM in the overlapping area, as shown in FIG. 4, includes the evaluation values calculated from the polarization parameters of each of the plurality radar devices 11, which may be different from each other. The left side of FIG. 4 conceptually shows a case where the evaluation values based on the polarization parameters of the plurality of radar devices 11 installed at the three points a, b and c are included in the same observation mesh OM.

The aggregating part 61 obtains an evaluation value in the observation mesh OM by integrating a plurality of evaluation values. Hereinafter, an evaluation value obtained by integrating the evaluation values obtained by the observation of the plurality of radar devices 11 is referred to as a composite evaluation value. The composite evaluation value takes N values per observation mesh OM.

There are various methods for integrating the evaluation values, among that one method may include averaging the evaluation values. However, it is preferable to integrate the evaluation values in consideration of the positions to which the evaluation values are associated. For example, it is preferable that if the position corresponding to a certain evaluation value is closer to a center point P that is a representative point of the observation mesh OM, then the evaluation value has a greater weight to be integrated in the composite evaluation value. Thus, a known Cressman interpolation method can be used as a calculation method.

As shown in FIG. 3, the aggregating part 61 includes a coordinate conversion part 62 and an interpolation part 63.

The coordinate conversion part 62 converts the position in the spherical coordinate system (r, θ, φ) associated with each evaluation value into a position in the Cartesian coordinate system (x, y, z). The distribution of the evaluation values based on the polarization parameters of the three radar devices 11 is represented by a unified coordinate system. The coordinate conversion part 62 outputs the distribution of the evaluation values expressed in the Cartesian coordinate system to the interpolation part 63. The coordinate conversion from the polar coordinate system to the Cartesian coordinate system can be achieved by a known transformation equation.

The interpolation part 63 generates the composite evaluation value based on the evaluation value for each radar device 11 inputted from the coordinate conversion part 62 by a known interpolation method and having substantially equal positions on coordinates. The interpolation part 63 obtains an evaluation value at an appropriate representative point (Typically center point P) of the observation mesh OM as the composite evaluation value. In the present embodiment, the interpolation part 63 generates the composite evaluation value by the Cressman method. Therefore, on an assumption that a distance between the position of the evaluation value and the center point P is smaller than a predetermined influence radius, the composite evaluation value in consideration of a weight set based on the distance can be generated. It is preferable that the interpolation part 63 sets an average value of the evaluation values whose coordinate positions are substantially equal among the different radar devices 11 among the evaluation values of the Cartesian coordinate system acquired for each of the plurality of radar devices 11 as the composite evaluation value. Thus, the evaluation values to be integrated are averaged to calculate the composite evaluation value having validity.

When calculating the composite evaluation value, the interpolation part 63 may perform the weighting set based on the distance between the position associated with each evaluation value and the radar device 11 which has observed the polarization parameter on which the evaluation value is calculated. By adopting this configuration, the evaluation values based on the polarization parameters acquired by the radar device 11 closer to the observation mesh OM can be integrated with more importance than the radar device 11 farther from the observation mesh OM. Therefore, a more reliable composite evaluation value can be obtained.

Instead of or in addition to the weighting set based on the distance to the radar device 11, the interpolation part 63 may perform a weighting set based on the signal intensity or the signal-to-noise ratio of the radar reception signal obtained from the position associated with each evaluation value. For example, the type of the precipitation particle can be more appropriately classified by performing the weighting set in accordance with the reliability of the radar reception signal, when the signal intensity is attenuated in observation of a heavy rain area or the like.

The interpolation part 63 outputs the distribution of the composite evaluation value generated for each observation mesh OM in the Cartesian coordinate system to the classification part 71. The composite evaluation value is N for one observation mesh OM.

The aggregating part 61 performs processing for the observation mesh OM in a portion included only in the scanning area S of one radar device 11, as well as the observation mesh OM in a portion where the scanning areas S overlap. The evaluation value at the center point P of the observation mesh OM is obtained by using the Cressman interpolation. Since the distribution of the evaluation values obtained from the fuzzy processing part 51 is based on the polar coordinate mesh, a plurality of evaluation values based on the observation of one radar device 11 may be included in one observation mesh OM. In this case as well, the evaluation values at the center point P may be obtained by substantially the same method as the method for integrating the evaluation values based on the observations of the plurality of radar devices 11.

In the observation mesh OM and the like shown in FIG. 4, for ease of understanding, a case where the position associated with the evaluation value is included in the observation mesh OM is depicted. However, for example, in the case that the influence radius described above in the Cressman interpolation is increased, the evaluation value located outside the observation mesh OM may affect the composite evaluation value or the evaluation value at the center point P of the observation mesh OM.

The classification part 71 classifies the type of the precipitation particle for each observation mesh OM based on the distribution of the composite evaluation value or the composite evaluation value outputted from the interpolation part 63. Specifically, the classification part 71 classifies, as the classification result, a type of the precipitation particle whose evaluation value or composite evaluation value is largest among the types of the precipitation particles. The classification part 71 outputs a distribution of the classification result of the precipitation particles to the output part 81 in the form of the Cartesian coordinate distribution.

The output part 81 includes, for example, a communication device for data communication with an external recording server or the like by a wired or wireless communication. The output part 81 outputs the distribution of the classification result of the precipitation particles to the external recording server or the like.

Here, in a case if the classification result of the precipitation particles are individually obtained based on the respective observations of the radar device 11 in a portion where the scanning areas S overlap and then integrated, it is difficult to draw a proper conclusion when a discrepancy in the classification occurs. More specifically, in the same observation mesh OM where the scanning areas S of the two radar devices 11 overlap, it is difficult to determine which classification result is to be selected when it is classified as rain in the observation of one radar device 11 and as hail in the observation of the other radar device 11. In this regard, in the present embodiment, a single classification result can be obtained after the evaluation values, which are quantitative values, are integrated for the plurality of radar devices 11. Therefore, it is possible to avoid the above difficulty of classification and obtain an appropriate classification result in a comprehensive manner.

Figure 5:
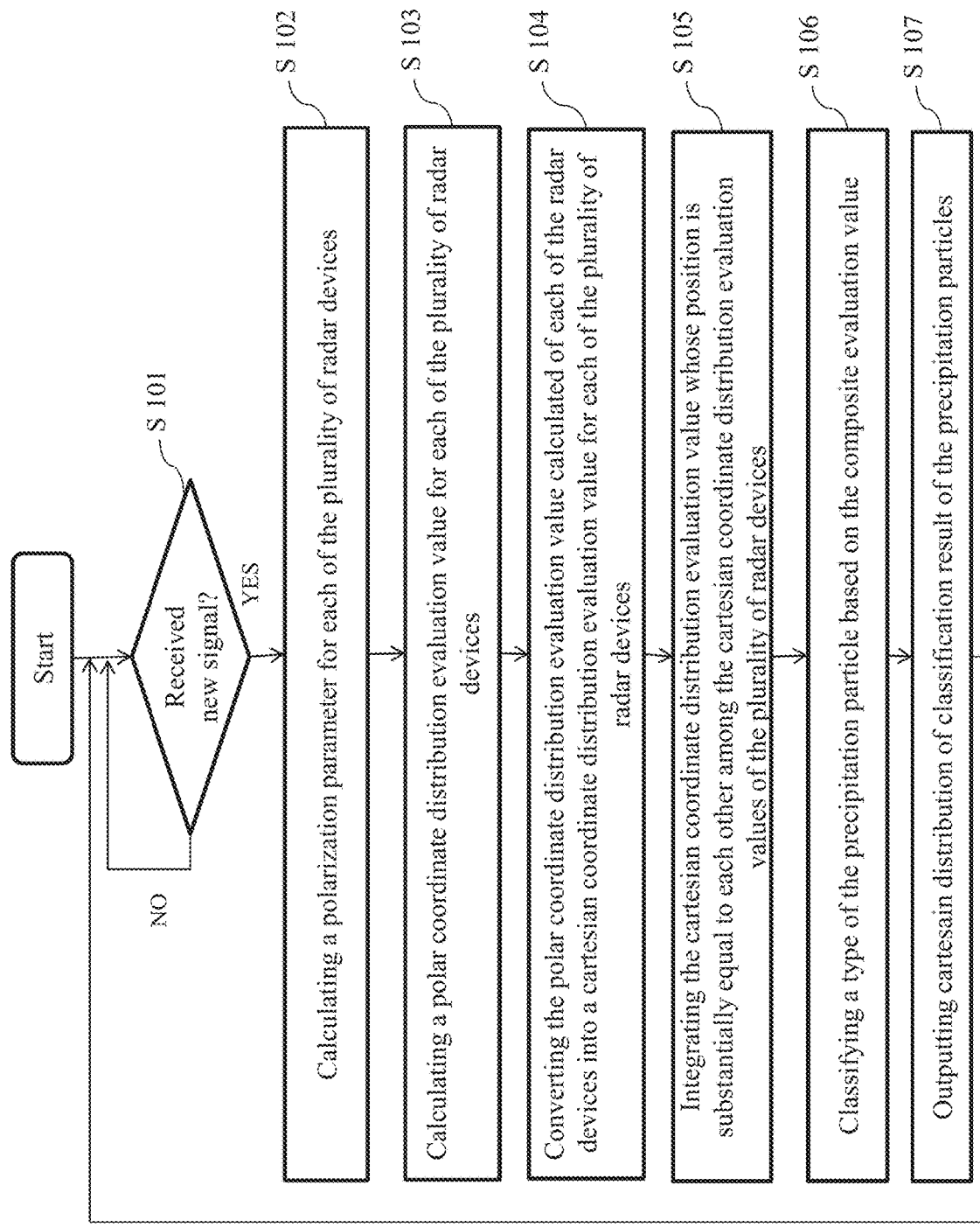
FIG. 5 is a flowchart showing operations performed by the precipitation particle classification apparatus.

Next, with reference to FIG. 5, the processing performed by the precipitation particle classification program will be described. FIG. 5 is a flowchart showing processing steps executed in the precipitation particle classification apparatus 31.

When the processing is started, the precipitation particle classification apparatus 31 waits until a reception signal is inputted from each radar device 11 (Step S 101).

When the reception signal is inputted to the precipitation particle classification apparatus 31, the data processing part 41 calculates the polarization parameter for each polar coordinate mesh for each radar device 11 and calculates the polar coordinate distribution of the polarization parameter (Step S 102).

Next, the fuzzy processing part 51 applies the fuzzy membership function MBFm_n to the polar coordinate distribution of the polarization parameter of each radar device 11 to obtain the degree of attribution to each type of the precipitation particles. The fuzzy processing part 51 calculates the polar coordinate distribution of the evaluation value from the degree of attribution (Step S 103).

When the polar coordinate distribution of the evaluation values is obtained for each radar device 11, the aggregating part 61 converts the position included in each polar coordinate distribution from the polar coordinate system to the Cartesian coordinate system (Step S 104). Further, the aggregation part 61 obtains an evaluation value for each observation mesh OM that is an Cartesian mesh by interpolation. In an area where the scanning areas S overlap with each other, the aggregating part 61 obtains the composite evaluation value by integrating the evaluation values based on observations of each radar device 11 (Step S 105).

When the Cartesian coordinate distribution of the composite evaluation value is obtained, the classification part 71 classifies the type of the precipitation particle for each observation mesh OM based on the evaluation value or the composite evaluation value, and generates the Cartesian coordinate distribution of the classification result (Step S 106).

The output part 81 outputs the Cartesian coordinate distribution of the classification result to the external recording server or the like (Step S 107). Thereafter, the process returns to step 101 and the precipitation particle classification apparatus 31 waits until a new reception signal is received from each radar device 11.

Therefore, the program can be said to cause the computer to execute the data processing steps, the fuzzy processing steps, the coordinate conversion step, the interpolation step, and the classification step shown in FIG. 4. In the data processing step, a polarization parameter is calculated based on the reception signal obtained by reflecting on the precipitation particles from each of the plurality of radar devices 11 (Step S 102). In the fuzzy processing step, an evaluation value indicating the degree of attribution to each type of precipitation particles is calculated by the fuzzy inference based on the polar coordinate distribution of polarization parameters acquired from each of the plurality of radar devices 11. By this step, the distribution of the evaluation values on the polar coordinates is calculated for each radar device 11 (Step S 103). In the coordinate conversion step, the distribution of the evaluation values on the polar coordinates obtained for the plurality of radar devices 11 is converted into the distribution of the evaluation values on the Cartesian coordinate system (Step S 104). In the interpolation step, the evaluation values on the Cartesian coordinates of the plurality of radar devices 11 are integrated to generate a (Cartesian mesh, observation mesh in OM parts) distribution of the composite evaluation value in the Cartesian coordinate system (Step S 105). In the classification step, the distribution in the Cartesian coordinate system of the classification result of the type of the precipitation particles is acquired based on the distribution in the Cartesian coordinate system of the composite evaluation value (Step S 106). When this program is executed in the precipitation particle classification apparatus 31, the precipitation particle classification method of the present disclosure can be realized.

As described above, the precipitation particle classification apparatus 31 of the present embodiment includes the data processing part 41, the fuzzy processing part 51, the coordinate conversion part 62, the interpolation part 63, and the classification part 71. The data processing part 41 calculates the polarization parameter based on the reception signal obtained by reflection on the precipitation particles from each of the plurality of radar devices 11 arranged at mutually different positions and having a part of the scanning area S overlapping with each other. The fuzzy processing part 51 calculates the polar coordinate distribution evaluation value. The polar coordinate distribution evaluation value is the distribution in polar coordinates of an evaluation value representing the degree of attribution to each precipitation particle type from the polarization parameter by using the fuzzy interface. The coordinate conversion part 62 converts the polar coordinate distribution evaluation value into the Cartesian coordinates, and calculates the Cartesian coordinate distribution evaluation value indicating the distribution of the evaluation value in the Cartesian coordinate system. The interpolation part 63 integrates the Cartesian coordinate distribution evaluation values whose positions on coordinates are substantially equal among the Cartesian coordinate distribution evaluation values calculated for each radar device 11 to generate the composite evaluation value. The classification part 71 classifies the type of the precipitation particle based on the composite evaluation value.

The precipitation particle classification apparatus 31 of this embodiment does not integrate qualitative classified results obtained from the respective radar devices 11 in a part where the scanning areas S overlap with each other. However, the precipitation particle classification apparatus 31 integrates quantitative evaluation values obtained by evaluating the degree of attribution to each kind of precipitation particle in the fuzzy inference with respect to the plurality of radar devices 11. Since a single classification result is obtained based on the composite evaluation value generated by the integration, an appropriate classification result can be obtained.

Although the preferred embodiment of the present disclosure has been described above, the above configuration can be changed, for example, as follows.

The aggregating part 61 may separately calculate the Cartesian coordinate distribution of the evaluation values in units of the observation mesh OM for the respective radar devices 11, and then integrate them with each other to obtain the Cartesian coordinate distribution of the composite evaluation values.

The size of each observation mesh OM can be, for example, a cubic lattice of 1 kilometer, but is not limited thereto. The observation mesh OM may have a rectangular parallelepiped shape, for example, instead of a cubic shape.

Each radar device 11 may scan a two-dimensional area. In this case, the observation mesh is defined as a lattice-like two-dimensional mesh dividing the entire two-dimensional plane.

The number of radar devices 11 is not limited to three, but may be two or four or more.

The data processing part 41 may be provided in a separate device from the precipitation particle classification apparatus 31. For example, the data processing part 41 may be provided in the radar device 11. The data processing part 41 may be provided in a server or the like which can receive the reception signal from the radar device 11 and output data to the precipitation particle classification apparatus 31.

TERMINOLOGY

Not all objects or effects/advantages can be achieved in accordance with any particular embodiment described herein. Thus, for example, those skilled in the art will recognize that a particular embodiment may be configured to operate to achieve or optimize one or more effects and advantages as taught herein without necessarily achieving other objects or advantages as taught or suggested herein.

All of the processing described herein may be embodied in a software code module executed by a computing system comprising one or more computers or processors, and may be fully automated. The code modules may be stored on any type of non-temporary computer readable medium or other computer storage device. Some or all of the methods may be embodied in dedicated computer hardware.

It is apparent from the present disclosure that there are many other variations besides those described herein. For example, depending on the embodiment, any particular operation, event, or function of the algorithms described herein may be performed in a different sequence and may be added, merged, or completely excluded (For example, not all acts or events described are necessary for the execution of the algorithm). Furthermore, in certain embodiments, the operation or event may be performed in parallel, rather than sequentially, for example, via multithreading, interrupt processing, or multiple processors or processor cores, or on other parallel architectures. In addition, different tasks or processes may be performed by different machines and/or computing systems that may work together.

The various exemplary logic blocks and modules described in connection with the embodiments disclosed herein may be implemented or implemented by a machine, such as a processor. The processor may be a microprocessor, but alternatively, the processor may be a controller, microcontroller, or state machine, or a combination thereof. The processor may include electrical circuitry configured to process computer executable instructions. In another embodiment, the processor includes an application specific integrated circuit (ASIC), a field programmable gate array (FPGA), or other programmable device that performs logical operations without processing computer executable instructions. The processor may also be implemented as a combination of computing devices, for example, a combination of a digital signal processor (Digital signal processor) and a microprocessor, a plurality of microprocessors, one or more microprocessors combined with a DSP core, or any other such configuration. Although described herein primarily in terms of digital technology, the processor may also include primarily analog elements. For example, some or all of signal processing algorithms described herein may be implemented by analog circuits or mixed analog and digital circuits. The computing environment may include any type of computer system including, but not limited to, a microprocessor, a mainframe computer, a digital signal processor, a portable computing device, a device controller, or a computer system based on a computing engine within the device.

Unless otherwise specified, conditional languages such as "capable of" "Done" "Yeah." or "There is a possibility." are understood in meaning within the context generally used to convey that a particular embodiment includes certain features, elements, and/or steps, but not other embodiments. Thus, such a conditional language generally does not mean that the features, elements, and/or steps are any method required for one or more embodiments, or that one or more embodiments necessarily include logic to determine whether these features, elements, and/or steps are included in or performed in any particular embodiment.

A disjunctive language such as the phrase "At least one of X, Y, and Z" is understood in the context in which it is commonly used to indicate that an item, term, etc., may be X, Y, Z, or any combination thereof, unless otherwise stated (Example: X, Y, Z). Thus, such a disjunctive language generally does not mean that a particular embodiment requires each of at least one of X, at least one of Y, or at least one of Z, each of which is present.

Any process description, element or block in the flow diagram described herein and/or shown in the accompanying drawings should be understood to potentially represent a portion of a module, segment, or code, including one or more executable instructions for implementing a particular logical function or element in the process. Alternative embodiments are included within the scope of the embodiments described herein, wherein the elements or functions may be deleted from the illustrated or described, and performed in any order, substantially simultaneously or in reverse order, depending on the associated functionality, as will be understood by those skilled in the art.

Unless otherwise specified, a numeral such as "one" should generally be interpreted as including one or more described items. Thus, phrases such as "one device configured to ~" are intended to include one or more enumerated devices. Such one or more enumerated devices may also be collectively configured to perform the described citation. For example, "Processor configured to perform the following A, B, and C" may include a first processor configured to execute A and a second processor configured to execute B and C. In addition, even if the specific number of enumerations of the embodiments introduced are explicitly enumerated, those skilled in the art should interpret such enumerations as typically meaning at least the number enumerated (For example, a simple enumeration of "With two enumerations and" without other modifiers usually means at least two enumerations or more than one enumeration).

In general, the terms used herein should generally be construed as the term "Unlimited" (e.g., the term "including . . . " should be construed as "not only that but also contains at least" the term "hold . . . " should be construed as "at least have" and the term "Include" should be construed as "Including, but not limited to, the following:" This should be interpreted as follows.) Those skilled in the art will recognize that.

For purposes of illustration, the term "HORIZONTAL" as used herein is defined as a plane parallel to the plane or surface of the floor of the area in which the described system is used, regardless of its orientation, or as a plane on which the described method is performed. The term "floor" may be replaced by the term "ground" or "water surface". The term "Vertical/Vertical" refers to the vertical/vertical direction of the defined horizon. Terms such as "Upper" "Bottom", "Side", "higher", "lower", "up", "beyond . . . " and "lower" are defined for the horizontal plane.

As used herein, the terms "attach", "connect", "pair up" and other related terms should be construed to include removable, movable, fixed, adjustable and/or removable connections or linkages, unless otherwise noted. The connection/connection includes a direct connection and/or a connection having an intermediate structure between the two components described.

Unless otherwise indicated, as used herein, the numbers preceded by terms such as "roughly", "in substance", and include the enumerated numbers and represent amounts close to the stated amounts that further perform the desired function or achieve the desired result. For example, "roughly", "in substance" and mean values less than 10% of the stated values unless otherwise specified. As used herein, features of embodiments in which terms such as "roughly", "in substance", and have been previously disclosed represent features that further have some variability in performing a desired function or achieving a desired result with respect to that feature.

Many variations and modifications may be added to the embodiments described above, and their elements should be understood as falling within other acceptable examples. All such modifications and variations are intended to be included within the scope of the present disclosure and are protected by the following claims.

What is claimed is:

1. An apparatus for classifying a type of a precipitation particle, comprising:
   a processing circuitry configured to:
   receive a reception signal obtained by reflecting on precipitation particles from each of a plurality of radar devices which are arranged at mutually different positions and have a part of a scanning area overlapping with each other;
   calculate a polarization parameter based on the reception signal;
   calculate a polar coordinate distribution evaluation value indicating a distribution on polar coordinates of an evaluation value which indicates a degree of attribution for each type of the precipitation particles, based on the polarization parameter, by using a fuzzy inference;
   convert the polar coordinate distribution evaluation value into a Cartesian coordinate distribution evaluation value indicating a distribution of the evaluation value on Cartesian coordinates;
   integrate the Cartesian coordinate distribution evaluation value whose position is equal to each other among Cartesian coordinate distribution evaluation values calculated for each of the plurality of radar devices and output a composite evaluation value; and
   classify the type of the precipitation particle based on the composite evaluation value.

2. The apparatus according to claim 1, wherein to calculate the polar coordinate distribution evaluation value, the processing circuitry is further configured to:
   store at least one fuzzy membership function for each of the plurality of radar devices, wherein the at least one fuzzy membership function for each of the plurality of radar devices is different for each of the plurality of radar devices; and
   determine, using the at least one fuzzy membership function for each of the plurality of radar devices, the degree of attribution.

3. The apparatus according to claim 2, wherein to integrate the Cartesian coordinate distribution evaluation value, the processing circuitry is further configured to:
calculate an average value of the Cartesian coordinate distribution evaluation values which are in the same position on the Cartesian coordinates among the plurality of radar devices, and
output the composite evaluation value based on the average value.

4. The apparatus according to claim 2, wherein to integrate the Cartesian coordinate distribution evaluation value, the processing circuitry is further configured to perform a weighting set based on a signal intensity or a signal-to-noise ratio of the reception signal obtained from a position corresponding to the Cartesian coordinate distribution evaluation value.

5. The apparatus according to claim 1, wherein to integrate the Cartesian coordinate distribution evaluation value, the processing circuitry is further configured to perform a weighting set based on a signal intensity or a signal-to-noise ratio of the reception signal obtained from a position corresponding to the Cartesian coordinate distribution evaluation value.

6. The apparatus according to claim 1, wherein to integrate the Cartesian coordinate distribution evaluation value, the processing circuitry is further configured to:
calculate an average value of the Cartesian coordinate distribution evaluation values which are in the same position on the Cartesian coordinates among the plurality of radar devices, and
output the composite evaluation value based on the average value.

7. The apparatus according to claim 6, wherein to integrate the Cartesian coordinate distribution evaluation value, the processing circuitry is further configured to perform a weighting set based on a signal intensity or a signal-to-noise ratio of the reception signal obtained from a position corresponding to the Cartesian coordinate distribution evaluation value.

8. The apparatus according to claim 6, wherein to integrate the Cartesian coordinate distribution evaluation value, the processing circuitry is further configured to perform a weighting set based on a distance between a position corresponding to the Cartesian coordinate distribution evaluation value and the radar device outputting a polarization parameter corresponding to the Cartesian coordinate distribution evaluation value.

9. The apparatus according to claim 2, wherein to integrate the Cartesian coordinate distribution evaluation value, the processing circuitry is further configured to perform a weighting set based on a distance between a position corresponding to the Cartesian coordinate distribution evaluation value and the radar device outputting a polarization parameter corresponding to the Cartesian coordinate distribution evaluation value.

10. The apparatus according to claim 1, wherein to integrate the Cartesian coordinate distribution evaluation value, the processing circuitry is further configured to perform a weighting set based on a distance between a position corresponding to the Cartesian coordinate distribution evaluation value and the radar device outputting a polarization parameter corresponding to the Cartesian coordinate distribution evaluation value.

11. A system for classifying a type of a precipitation particle, comprising:
a plurality of radar devices arranged at different positions, wherein each of the plurality of radar devices have a part of a scanning area overlapping with each other, and wherein each of the plurality of radar devices is configured to:
transmit a radio wave; and
receive a reception signal obtained by reflection of the radio wave from the precipitation particle; and
a processing circuitry configured to
calculate a polarization parameter based on the reception signal;
calculate a polar coordinate distribution evaluation value indicating a distribution on polar coordinates of an evaluation value which indicates a degree of attribution for each type of the precipitation particles, based on the polarization parameter, by using a fuzzy inference;
convert the polar coordinate distribution evaluation value into a Cartesian coordinate distribution evaluation value indicating a distribution of the evaluation value on Cartesian coordinates;
integrate the Cartesian coordinate distribution evaluation value whose position is equal to each other among Cartesian coordinate distribution evaluation values calculated for each of the plurality of radar devices and output a composite evaluation value; and
classify the type of the precipitation particle based on the composite evaluation value.

12. A method for classifying a type of a precipitation particle, comprising:
receiving a reception signal obtained by reflecting on precipitation particles from each of a plurality of radar devices which are arranged at mutually different positions and have a part of a scanning area overlapping with each other;
calculating a polarization parameter based on the reception signal;
calculating a polar coordinate distribution evaluation value indicating a distribution on polar coordinates of an evaluation value which indicates a degree of attribution for each type of the precipitation particles, based on the polarization parameter, by using a fuzzy inference;
converting the polar coordinate distribution evaluation value into a Cartesian coordinate distribution evaluation value indicating a distribution of the evaluation value on Cartesian coordinates;
integrating the Cartesian coordinate distribution evaluation value whose position is equal to each other among Cartesian coordinate distribution evaluation values calculated for each of the plurality of radar devices and outputting a composite evaluation value; and
classifying the type of the precipitation particle based on the composite evaluation value.

* * * * *